B. G. WAGGNER.
GAS METER.
APPLICATION FILED AUG. 9, 1915.

1,177,553.

Patented Mar. 28, 1916.

WITNESS:
Rob R Kitchel.

INVENTOR
Benjamin G. Waggner.
BY
Augustus B. Stoughton.
ATTORNEY.

UNITED STATES PATENT OFFICE.

BENJAMIN G. WAGGNER, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

GAS-METER.

1,177,553.  Specification of Letters Patent.  Patented Mar. 28, 1916.

Application filed August 9, 1915. Serial No. 44,377.

*To all whom it may concern:*

Be it known that I, BENJAMIN G. WAGGNER, a citizen of the United States, residing at Philadelphia, in the county of Philadelphia and State of Pennsylvania, have invented certain new and useful Improvements in Gas-Meters, of which the following is a specification.

The principal object of the present invention is to provide simple, reliable and comparatively inexpensive stop-motion mechanism for a gas meter whereby its tangent arm is permitted to turn backward approximately one revolution, or at any rate sufficiently to relieve any undue pressure that may be brought to bear upon the mechanism of the gas meter and which might tend to destroy or injure the same by reason of such changes of gas pressure as may and frequently do occur when the gas has been turned off from a building or residence in which case the temperature may change after the gas has been turned off, so that when the gas is again turned on the pressure may be higher at the outlet end of the meter than it is at the inlet end of the meter.

The invention will be claimed at the end hereof but will be first described in connection with the embodiment of it chosen for illustration in the accompanying drawings, in which—

Figure 1:
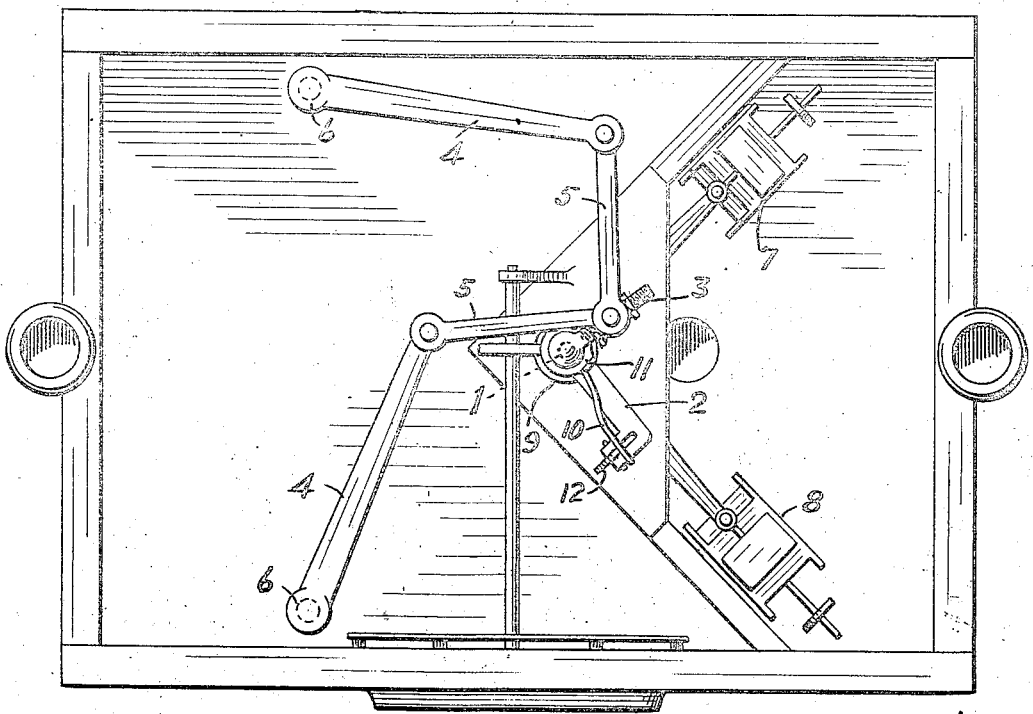
Figure 2:
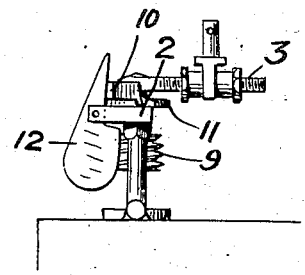
Figure 3:
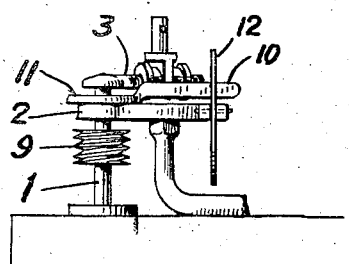

Figure 1, is a top or plan view of a meter provided with mechanism embodying features of the invention. Fig. 2, is an elevational view of mechanism embodying features of the invention and showing one position of the parts thereof, and Fig. 3, is a similar view, taken at right angles to the view of Fig. 2.

In the drawings 1 is a revoluble shaft, the upper end of which is shown as supported by a bracket 2 through which it extends.

3 is a tangent or driving arm fast to the shaft 1 and by means of which the shaft is driven. As shown this arm 3 is driven from the bellows, not shown, by the usual long and short flag arms 4 and 5 connected with the flag wires or rods 6, which are operated upon by the flags and bellows not shown. The lower end of this shaft 1 serves to operate the valves 7 and 8. All of this is well understood as is also the fact that the worm 9 operates the registering mechanism.

10 is an arm loose in respect to the shaft 1 and adapted to collide with the tangent arm 3 in two extreme positions. As shown the arm 10 is struck up from a flat hub 11 that turnably encircles the shaft 1 and rests upon the top of the bracket 2. The arms 3 and 10 are in substantially the same plane and this is advantageous particularly where the invention is applied to old meters, because there is not much room between the top of the bracket and the arm 3.

12 is a click or back-stop detent disposed in range of the loose arm 10 but clear of the tangent arm. As shown the tangent arm is so short that it clears the upper part of the click or detent 12 while the arm 10 is longer and collides with the upper part of the detent or click. The click is pivoted and weighted or balanced so that it normally occupies the position shown in Fig. 2. However, its upper end may turn toward the right in that figure so as to let the arm 10 pass but the upper end of the click cannot turn toward the left in Fig. 2 and so the arm 10 cannot pass it when moving in the opposite direction.

In use the tangent arm 3 is turned counter-clockwise in Fig. 1 and it is behind the arm 10 and in contact with it and so the arm 3 pushes the arm 10 before it in a counter-clock-wise direction, the arm 10 tipping the detent at each revolution. Under these circumstances gas is passing through the meter from the mains and is being measured. If for any cause as has been above referred to the gas pressure on the outlet of the meter exceeds the gas pressure of the inlet of the meter, the tangent arm will be driven in a clock-wise direction and will leave its position behind the arm 10 and assume a position in front of the arm 10 so that when the arm 10 collides with the top of the detent 12 from right to left in Fig. 2, the arm 3 will be arrested but the arm 3 will have made at least substantially one revolution in a clock-wise or backward direction. It may make more than one revolution but it cannot make less than one revolution minus the angular distance between the arms when they collide on opposite sides, which distance is but a few degrees. The extent of the backward revolution insured the arm 10 in passing from one side to the other of the tangent arm is sufficient to relieve the meter mechanism of such excess of pressure on its outlet end as would tend to injure its mechanism. Furthermore the degree of backward motion insured the tangent arm before it is arrested is sufficient to prevent dishonest people from running the meter backward by reversing its connections, with the intent and purpose of reducing its registration.

It will be obvious to those skilled in the art to which the invention relates that modifications may be made in details of construction and arrangement without departing from the spirit of the invention, which is not limited as to such matters.

What I claim is:

1. In a gas meter the combination of a driven shaft, two arms whereof one is a tangent arm and is fast to said shaft and drives the same and whereof the other is loose in respect to said shaft and said arms adapted to collide in two extreme positions thereof, and a back-stop detent disposed in range of said loose arm and clear of the tangent arm, substantially as described.

2. In a gas meter the combination of a shaft provided with a fast driving or tangent arm and a loose arm arranged to move substantially in the same plane and said arms adapted to collide in two extreme positions thereof, and a back-stop detent disposed in range of said loose arm and clear of the tangent arm, substantially as described.

3. In a gas meter the combination of a bracket, a shaft having a driving or tangent arm, a hub loosely encircling the shaft and resting upon the bracket and provided with an upstanding arm projecting into the plane of motion of the tangent arm and adapted to collide therewith in two extreme positions, and a back-stop detent clear of the tangent arm and in range of the other arm, substantially as described.

In testimony whereof I have hereunto signed my name.

BENJAMIN G. WAGGNER.